Patented June 12, 1945

2,378,155

UNITED STATES PATENT OFFICE 2,378,155

TREATMENT OF ADSORBENT ALUMINA

James W. Newsome, Belleville, Ill., and Ralph B. Derr, Oakmont, Pa., assignors to Aluminum Company of America, Pittsburgh, Pa., a corporation of Pennsylvania No Drawing. Application March 24, 1943, Serial No. 480,344

4 Claims. (Cl. 23—143)

This invention relates to the production of adsorbent alumina, and relates particularly to a process for improving the sorptive characteristics of the highly porous, adsorbent, vitreous alumina produced by calcination of gelatinous aluminum hydroxide.

Gelatinous aluminum hydroxide may be formed by precipitation thereof from solutions of various aluminum compounds by well-known methods. This material contains a large amount of free or loosely held water, in addition to water which is held sufficiently firmly that to drive it off relatively high temperatures are required. When such material, properly produced, is calcined under such conditions as to drive off most of its water content, it is converted to hard, highly porous, and adsorbent vitreous material which is very effective in adsorbing moisture or water vapor from liquids or gases. The calcination of the gelatinous hydroxide should not be permitted to drive off all of the water present, for otherwise the sorptive power of the product is negligible. Preferably the calcined material contains between about 2-15 per cent by weight of water. Although the calcined product contains a small amount of water, at least some of which may be associated with alumina as aluminum hydroxide, and it also may contain small amounts of impurities, it is principally alumina and will be referred to herein as alumina.

The calcination of gelatinous aluminum hydroxide to convert it to hard, adsorbent product described above may be carried out by first heating the gelatinous hydroxide at a relatively low temperature—for example, 80–120° C.—to drive off free and loosely held water, and then heating it at 300° C. or over to drive off most of the more firmly held water, a temperature of about 300–500° C. being preferable for this operation. It is also possible to omit the initial low temperature drying, and carry out the calcination at the higher temperature.

It is an object of this invention to provide a method of improving the sorptive characteristics of porous, adsorbent, vitreous alumina produced by removing most of the water present in gelatinous aluminum hydroxide, and particularly to provide a method of rendering the alumina less susceptible to impairment of its sorptive capacity upon being heated to drive off adsorbed material, and of improving the capacity of the alumina for adsorption of moisture from gases of low relative humidity. It is a further object of this invention to provide adsorbent vitreous alumina to which fixed water has been added.

In accordance with this invention, adsorptive vitreous alumina of the type described above is heated in water at a temperature of at least 100° C. Although a temperature as low as 100° C. can be used in the process, heating the alumina in water in a closed pressure vessel or autoclave at higher temperatures effects the desired result more rapidly, and for that reason, temperatures of about 175° C. or over are preferred, subject to the limitations imposed by the pressure which the autoclave in which the treatment is performed will withstand. Steam may be used in place of water and circulated through the alumina, and the term "water" as used herein is intended to include steam.

The treatment described in the preceding paragraph increases the capacity of the alumina for adsorbing moisture from atmospheres having moderately low relative humidities; also the quantity of water and water vapor which alumina so treated will adsorb remains more constant upon repeated cycles of adsorption followed by heating to drive off the adsorbed material, than in the case of alumina which has not received the treatment described. In order to obtain these results, it is necessary that the treatment be applied to the calcined vitreous alumina, rather than to the gelatinous aluminum hydroxide from which the alumina is produced.

In addition to producing the effects just mentioned upon the sorptive characteristics of the alumina, the treatment also increases the density of the particles, and converts a portion of the alumina treated to crystalline aluminum alpha monohydrate. Ordinarily, an amount of water equal to up to 5 per cent of the weight of the material treated is added by the treatment, and this water is not driven off by heating the material at temperatures normally employed to drive off free or adsorbed water.

Although the invention has been described above only in connection with adsorbent vitreous alumina produced by calcining gelatinous aluminum hydroxide, it is also applicable to such alumina associated with one or more additional oxides, such as iron, chromium, or zirconium oxides, or silica, which may be incorporated in the alumina and whose presence may be desirable in some uses for the alumina. Such additional oxides can be mixed with the gelatinous aluminum hydroxide as such or as hydrous oxides prior to the calcining operation, or they may be co-precipitated with the gelatinous aluminum hydroxide by methods which are well-known, or they may be mixed thoroughly with the calcined, adsorbent alumina in finely divided form.

Various substances can be added directly to the alumina to impart desired characteristics to it, or by adding to the water in which the alumina is heated as described above materials which will yield the desired substances under the conditions of operation, with the result that the alumina is impregnated with the desired substances. For example, the alumina can be impregnated with chromium oxide by adding chromic acid or a soluble salt of chromium to the water. Similarly, the alumina can be impregnated with sodium hydroxide, sodium carbonate, sodium bicarbonate, or salts of such metals as calcium, nickel, iron, copper, zinc, manganese, or magnesium.

The following example illustrates the operation of the invention.

Gelatinous aluminum hydroxide and silica were co-precipitated by rapidly mixing equal volumes of an aqueous solution containing 60 grams per liter of sodium aluminate, and an aqueous solution containing 63 grams per liter of sodium bicarbonate and 2.4 grams per liter of sodium silicate, the solutions being at temperatures of 95° C. and 45° C., respectively. The gelatinous precipitate so produced was filtered from the liquid and washed thoroughly with water to remove soluble impurities. The filter cake containing about 90 per cent total water was then dried at 100° C. for 16 hours, after which the temperature was raised gradually to 450° C. in 4 hours and maintained at that point for 1 hour. The resulting hard, porous, vitreous material contained alumina and silica in the ratio of about 16 parts by weight of alumina to 1 of silica, calculating all aluminum values as alumina, and in addition contained about 4 per cent by weight of water.

A portion of this material was placed in an autoclave and covered with water, whereupon it was heated to a temperature of about 190° C. in 1 hour and kept at that temperature for an hour, after which it was removed from the autoclave and dried at about 220° C. to remove free and adsorbed moisture present. The table below shows the precentage of their weight of water vapor that samples of such material adsorb from a current of air at 30° C. and various relative humidities, both initially and after 400 cycles of adsorbing as much water vapor as possible, and then heating the material at 225° C. to drive off the adsorbed water. For comparison, the table also shows the percentage of their weight of water vapor adsorbed under the same conditions by samples of that portion of the alumina which had not been heated in water as described above. As shown by the table, the adsorption capacity of the alumina which had been heated in water remained more constant under repeated cycles of adsorption and heating than in the case of the material which had not been heated in water.

|  | Relative humidity | | |
| --- | --- | --- | --- |
|  | 15.7% | 51.0% | 69% |
| Vapor pressure—mm. of mercury | 5 | 16 | 22 |
| Material heated at 190° C. in water: | | | |
| Initial adsorption capacity | 9.8 | 22.2 | 35.2 |
| Adsorption capacity after 400 cycles | 8.2 | 18.3 | 33.1 |
| Material not heated in water: | | | |
| Initial adsorption capacity | 9.7 | 21.0 | 36.1 |
| Adsorption capacity after 400 cycles | 6.5 | 14.3 | 30.2 |

We claim:

1. The process of producing adsorbent alumina comprising drying aluminum hydroxide to a water content of between 2–15 per cent by weight, and subsequently heating the resulting alumina in contact with water under super-atmospheric pressure at a temperature above 100° C.

2. The process of producing adsorbent alumina comprising converting gelatinous aluminum hydroxide to hard, porous, vitreous alumina, and subsequently heating the resulting alumina in contact with water under super-atmospheric pressure at a temperature above 100° C.

3. The process of producing adsorbent alumina comprising converting gelatinous aluminum hydroxide to hard, porous, vitreous alumina by heating the gelatinous alumina at a temperature of at least 300° C., and subsequently heating the resulting alumina in an autoclave in contact with water under super-atmospheric pressure at a temperature above 100° C.

4. The process of producing adsorbent alumina comprising converting gelatinous aluminum hydroxide to hard, porous, vitreous alumina by heating the gelatinous alumina at a temperature of at least 300° C., and subsequently heating the resulting alumina in an autoclave in contact with water at a temperature of at least 175° C.

JAMES W. NEWSOME.
RALPH B. DERR.